United States Patent

Brixius et al.

[15] 3,698,161
[45] Oct. 17, 1972

[54] FILTER

[72] Inventors: Jacob K. Brixius, Parma; Lawrence M. Takacs, Solon; James P. Van Sweringen, Cleveland Heights, all of Ohio

[73] Assignee: North American Rockwell Corporation, Pittsburgh, Pa.

[22] Filed: Nov. 3, 1970

[21] Appl. No.: 87,366

[52] U.S. Cl. .......................... 55/493, 55/500, 55/521
[51] Int. Cl. .............................................. B01d 27/06
[58] Field of Search ........ 55/341, 483, 484, 486, 487, 55/493, 500, 501, 511, DIG. 12, DIG. 31; 210/493, 478

[56] References Cited

UNITED STATES PATENTS

| | | |
|---|---|---|
| 3,273,321 | 9/1966 | Bauder et al. ................. 55/487 |
| 3,385,039 | 5/1968 | Burke et al. .................. 55/502 |
| 3,568,413 | 3/1971 | Jerabek ....................... 55/500 |

FOREIGN PATENTS OR APPLICATIONS 111,406  11/1928  Austria ....................... 55/380

Primary Examiner—Bernard Nozick
Attorney—John R. Bronaugh, Floyd S. Levison, Dennis O'Connor and Richard A. Speer

[57] ABSTRACT

A filter for removing impurities from an airstream comprising a housing having filter media holding means operatively attached thereto and a flange portion disposed around said housing, a filter media retainer fixedly attached to said housing, filter media attached in an airtight manner on said flange portion by said holding means, said retainer retaining said media in such a position with respect to the airstream that said filter media forms two coaxial filter pockets of substantially equal depth, thereby optimizing the impurity-removing properties of said filter media.

2 Claims, 11 Drawing Figures

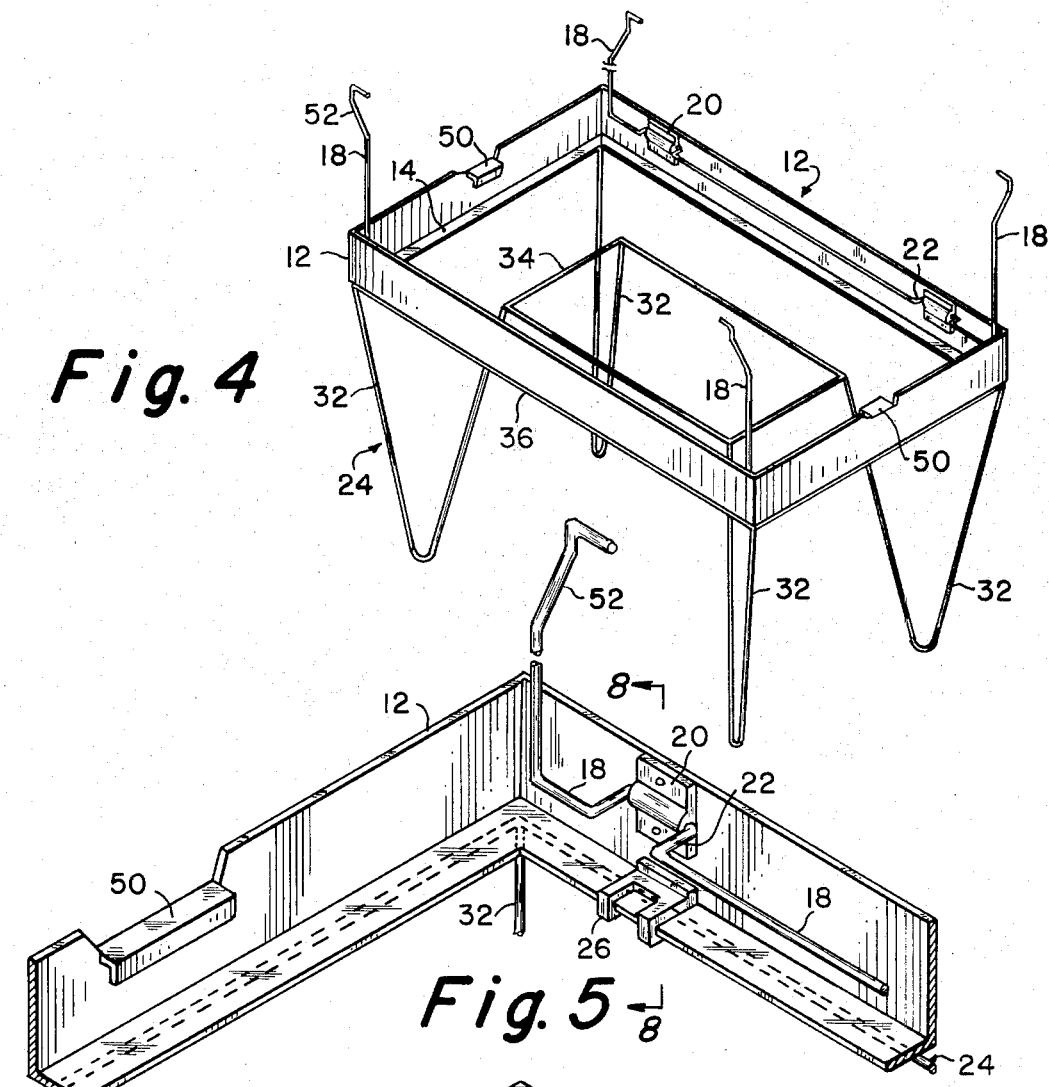
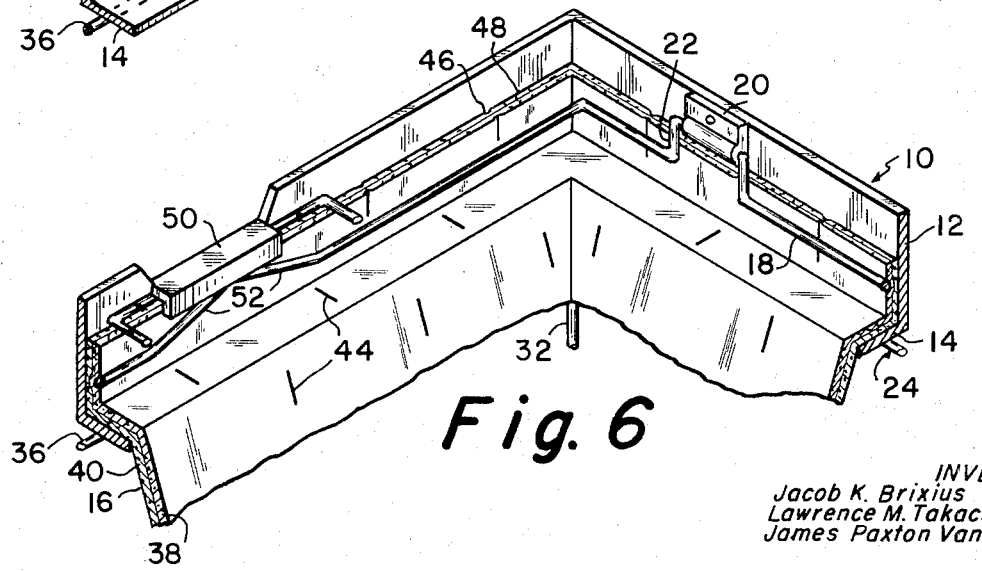

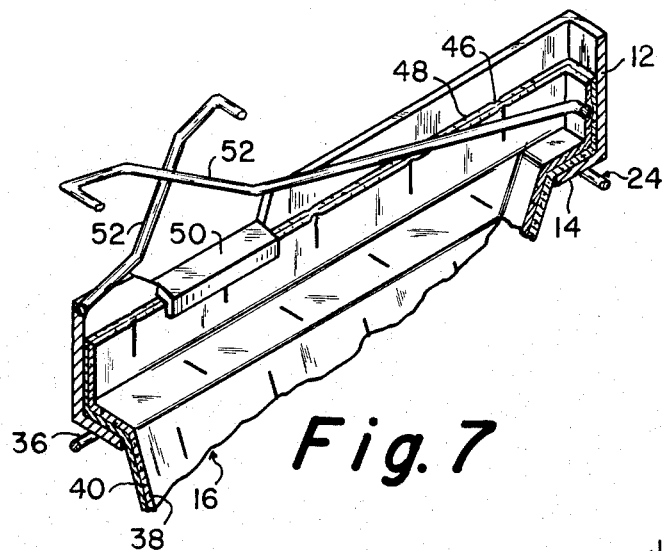
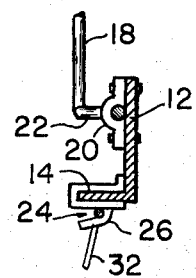
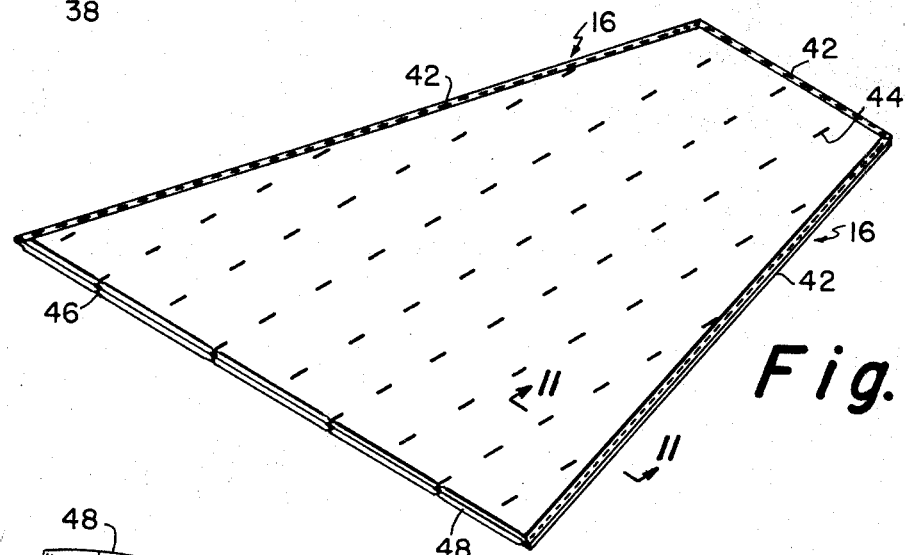
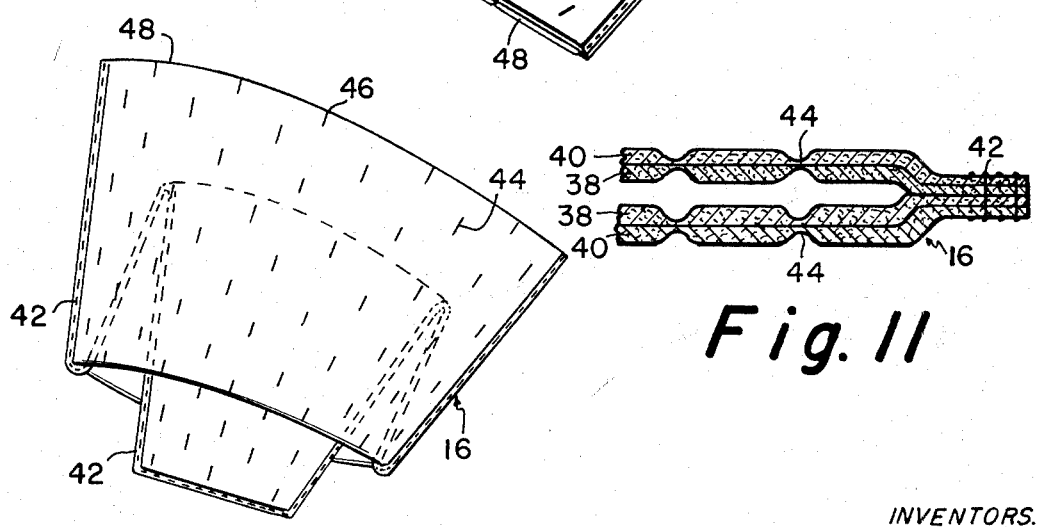

FILTER

BACKGROUND OF THE INVENTION

This invention generally relates to filters and, in particular, to air filters adapted for removing impurities from airstreams.

Environmental control has become an important consideration in constructing working and living spaces. Not only must the proper temperature and humidity be maintained in working and living areas, but also the overall purity of the ambient air. This latter factor, of course, has become more and more important as the "outside" air becomes progressively polluted. Accordingly, considerable attention has been directed toward providing efficient filtration apparatus in air conditioning and heating systems installed, for example, in domestic and office buildings.

The typical type filter employed in these systems are the so-called extended surface filters with replaceable filter media. These filters may be used individually or in a filter array, such as in a bank form. The filters are placed in an air duct or chamber through which the conditioned air flows.

The prior art forms of filters typically employ filter elements or cartridges utilizing multiple pockets. It is well known that when it becomes time to replace the filter media of this rather complicated device, it involves substantial down time of the entire air system. This is primarily due to the fact that it is relatively difficult to remove the filter media and replace it with a new "cartridge." It is also well known that the rather complicated types of filter units found in the prior art are inefficient both in terms of the particulate matter removal capability and airflow efficiency. Accordingly, a prior art form of extended surface filter will have a rather high pressure drop across the filter device, and this pressure drop will rise inordinately fast, thereby requiring premature and costly maintenance.

Another problem typically associated with the prior art forms of air filters used in air conditioning and air heating systems is, that due to their general inefficiency, their overall length must be increased to present a greater surface area to the airstream. This problem becomes particularly important in relation to the new "package" type air conditioning and air heating systems. If the depth of the air filter must be increased due to inefficiency, this will have an impact on the overall size of the packaged air system. If the overall depth of the filter must be increased, so must the overall size of the air system package, or at least the size of the accommodating ducting surrounding the filter.

SUMMARY OF THE INVENTION

It is, therefore, a primary object of the present invention to provide an air filter having optimum impurity-removing properties.

It is another object of the present invention to provide a filter having a replaceable filter media which may be easily replaced by a new filter thereby obviating any substantial down time of the air system in which it is disposed.

It is yet another object of the present invention to provide a filter having a filter media retained in the air duct in such a position with respect to the airstream within the air duct such that the filter media provides two coaxial filter pockets of substantially equal depth.

It is another object of the present invention to provide a filter having a filter media having at least two layers shaped in a substantially trapezoidal form and attached to each other at their peripheries on three sides only, the media adapted to be shaped such that it presents two coaxial filter pockets of substantially equal depth.

It is yet another object of the present invention to provide a filter having a filter media, as above, that has four similarly shaped layers, two each of said layers being attached to each other intermediate their ends as by heat sealing, the then attached layers being attached to each other at their periphery as, for example, by stitching.

These and other objects of the present invention as well as the advantage thereof over existing prior art forms will become apparent from the following detailed description of the attached drawings and are accomplished by means hereinafter described and claimed.

In general, a filter employing the concept of the present invention has a housing having a filter media holding means operatively attached thereto. The housing has a flange portion disposed around it and a filter media retainer fixedly attached to it with filter media attached in an airtight manner on the flange portion being so held thereon by the holding means. The retainer retains the filter media in such a position with respect to the airstream that it provides two coaxial filter pockets of substantially equal depth, thereby optimizing both the impurity-removing properties of the filter media and the airstream pattern of the filter.

One preferred embodiment of the present invention is shown by way of example in the accompanying drawings and is described in detail without attempting to show all of the various forms and modifications in which the invention might be employed, the invention being measured by the appended claims and not by the details of the specification.

DESCRIPTION OF THE DRAWINGS

FIG. 4 is an isometric view of the housing or frame of the filter of FIG. 1;

FIG. 5 is an isometric view of a portion of the frame of the filter of FIG. 1 showing the filter media holding means in its open position;

FIG. 6 is an isometric view of the portion of the filter of FIG. 1 showing a portion of the filter media attached in an airtight manner to the housing;

FIG. 7 is an isometric view of the portion of the filter of FIG. 1 showing a portion of the filter media positioned on the housing but not yet attached in place;

FIG. 8 is a fragmentary sectional view taken substantially on line 8—8 of FIG. 5;

FIG. 9 is an isometric view of the filter media in its prefolded state;

FIG. 10 is an isometric view of the filter media in its folded state; and

FIG. 11 is a fragmentary sectional view taken substantially on line 11—11 of FIG. 9.

DESCRIPTION OF THE INVENTION

Figure 1:
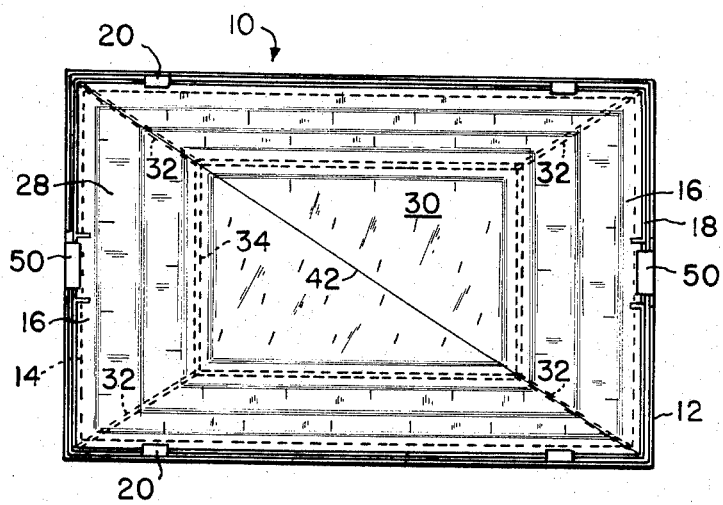
FIG. 1 is a front elevational view of a filter embodying the concept of the present invention.

Referring now to the drawings and, in particular FIG. 1 through FIG. 4, a filter employing the concept of the present invention is generally indicated by the numeral 10. The filter unit comprises a housing 12 which may take the form of a substantially rectangular frame. The frame of the housing 12 may be made or formed of a single section of sheet material, such as sheet steel, or may be fabricated from several formed sections of sheet material. The housing 12 could be also made of plastic, such as molded plastic, or could be made with a corrosion-resistant material to improve its corrosion resistance properties.

Figure 2:
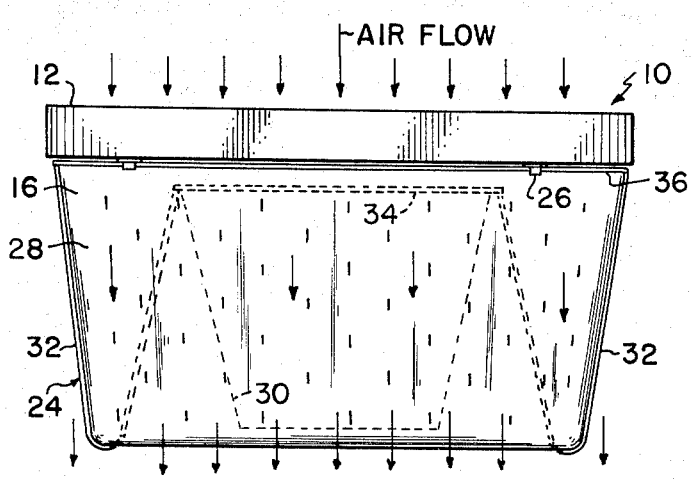
FIG. 2 is a side elevational view of the filter of FIG. 1 showing the airflow in an "in-out" direction.
Figure 3:
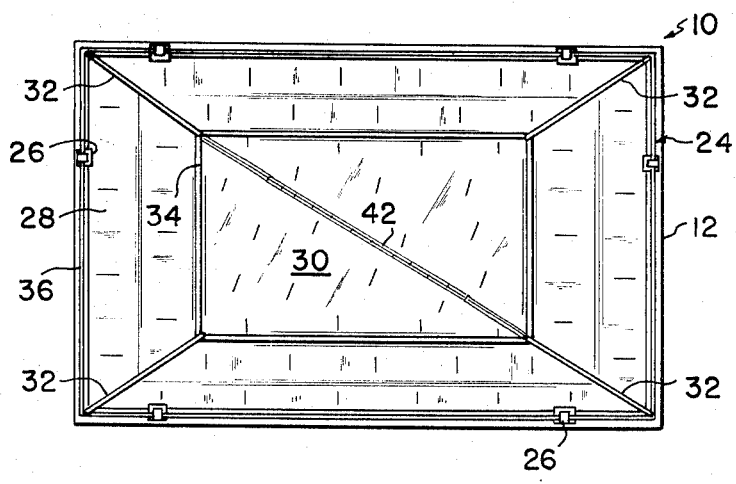
FIG. 3 is a bottom elevational view of the filter of FIG. 1.

The housing 12 may take many forms and shapes and is typically rectangular or square and is adapted to be placed in an accommodating air duct to remove particulate matter from the airstream. The filter 10 may be used individually or in a filter array, depending upon the particular air system involved. The air flow through the filter 10 typically, as can be seen in FIG. 2, is in the inside-out direction; that is, the housing 12 generally corresponds to the upstream side of the filter 10 while the bottom or rear of the filter, as depicted in FIG. 3, generally corresponds to the downstream side of the filter 10. The housing 12, as can be clearly seen in FIG. 4, is provided with a flange portion 14 disposed around the housing and adapted to receive the filter media 16. The housing 12 is further provided with filter media holding means 18 which are operatively connected to the housing 12 by means such as hinges 20. The hinges 20, which may be of sheet metal, are fixedly attached to the housing 12 by means such as riveting, welding, or sheet metal screws. The hinges 20 may be integral with and formed from the housing 12. This may be accomplished by piercing the housing to form a hinge portion. The filter media holding means 18 are pivotally disposed within the hinges 20 and their pivot points are offset from the plane of the sealing and attachment of the filter media 16 on the flange portion 14 in a manner to be later described. The offset of the filter media holding means 18 is effected by U-shaped portions 22. The housing 12 is also provided with a retainer 24 which is fixedly attached thereto by means such as clips 26. The retainer 24, which may be in the form of a metallic wire, supports or retains the filter media 16 in such a position with respect to the airstream that it provides two coaxial filter pockets 28 and 30. The retainer 24 has four substantially V-shaped diagonally disposed sections 32, each fixedly connected to one side of a substantially rectangular section 34. The V-shaped sections are each fixedly connected to a substantially rectangular section 36, which, in turn, is fixedly attached to the housing 12, as indicated above by means of clips 26. It should be noted that the retainer 24 may be formed of several parts and welded together or otherwise bonded to form a single unit. It should be also noted that, depending upon breakdown and shipping requirements, the retainer 24 could be so constructed that the rectangular section 36 could be eliminated by having each one of the V-shaped sections 32 each directly connected to the housing 12 by means such as welding, brazing and/or riveting.

The filter holding means 18 and retainer 24 may be fabricated from many types and forms of material. For example, holding means 18 may be made from hard drawn basic steel wire or hard drawn brass, bronze or aluminum. The retainer 24 may be fabricated from flat or round steel stock. The holding means 18 and retainer 24 could also, under certain system conditions be made of plastic and/or could be coated with corrosion resistant materials.

Referring now to FIGS. 9, 10 and 11, it can be seen that the filter media 16 is fabricated from at least two layers of filter material. The layers of filter material may be color-coded, as for example, one color for one layer and another color for a separate layer. Preferably the filter media 16 is fabricated from four layers of filter material, the inner layers 38 being of a coarser material than the outer layers 40. This, of course, corresponds to a flow pattern wherein the airstream first encounters the coarse filter material 28 and then encounters the finer material 40 as the airstream continues to flow downstream. The filter media 16 may be shaped into a substantially trapezoidal form with its periphery being joined or sealed on three sides thereof at joint 42 as by stitching, fusion, and the like. Before being so joined, as depicted in FIG. 9, the filter media 16 is first cut or shaped into individual and identical substantially trapezoidal shapes. A fine layer of filter material is then attached to a course layer of filter material by means such as fusion or heat sealing joints 44, which may be "in-line" and in an interrupted format. The heat sealing joints 44 may overlap the edge 46 of the filter media 16 so as to insure that the individual layers 38 and 40 are effectively attached to their respective partner layers at the open end 48 of the filter media 16. By attaching the layers 38 and 40 to each other using an in-line interrupted format, it can be seen that the layers are effectively attached to one another while not wasting any substantial amount of filter area. As can be also clearly seen from FIG. 10, the so shaped filter media 16 may be folded in such a manner as to enable it to be readily placed and supported by the retainer 24. The filter pocket 28 is retained or supported by the rectangular section 34 while the filter pocket 30 is retained or supported by the V-shaped sections 32.

The housing 12 may be also provided with locking lips 50, which may be formed from or attached to the housing 12 to lock the filter media holding means 18 in place. To replace a "dirty" filter media 16, one merely must disengage the filter media holding means 18 from the locking lips 50 by biasing the ramp portions 52 away from the locking lips 50 and then pivot the filter holding means away from the filter media 16. When both of the filter media holding means 18 are so unlocked and pivoted away from the filter media, the media may be removed from the housing 12. A new filter media 16 may then be folded, as shown in FIG. 10, forming two coaxial filter pockets. The so folded filter media may then be easily placed in the housing. The retainer 24 will readily accept the so folded filter media 16 and the flange portion 14 will radially accept a portion of the open end of the filter media 16. After the filter media 16 has been properly positioned on the retainer 24 and on the flange portion 14, the filter media holding means 18 are pivoted toward the locking lips 50. The filter media holding means may be so constructed that they may free pivot only to a point near the locking lips 50 and thus requiring a further force to bring them to a position at the end then in engagement with the locking lips 50. This additional biasing force to lock the filter media holding means within the locking lips will simultaneously mechanically lock the filter media 16 in place on the flange portion 14 as well as effect an airtight seal between the filter media 16 and housing 12 around the entire flange portion 14. The entire procedure of removal and replacement can be done with the filter 10 in place within the air duct. All that is required is that the duct work paneling or covering (not shown) be removed to gain access to the filter 10.

The layers of the filter material may be selected from a wide variety of commercially available flexible porous materials and, further the filter media may be sprayed or have otherwise applied to it a fire-retardant material and/or an efficiency improving adhesive, such as tricresylphosphate. The filter material may be made, for example, from acrylic fibers, and the like.

As such the filter embodying the concept of the present invention will, when disposed within an airstream, effectively and efficiently remove therefrom impurities without inhibiting the air flow therethrough. While the invention has been referred to in connection with the preferred embodiments, it will be understood that the invention is not limited thereto. Many changes in the construction arrangement may be made to the invention without departing from the spirit thereof, and this will be apparent to those having skill in the art.

What is claimed is:

1. A filter for removing impurities from an airstream comprising a housing having filter media holding means operatively attached thereto and a flange disposed within and about the inner periphery of said housing, a filter media retainer frame fixedly attached to said housing, filter media defining two coaxial pockets secured in an airtight manner on said flange by said holding means, said retainer frame retaining said media across said housing with the two integral coaxial filter pockets being of substantially equal depth, thereby optimizing the impurity-removing properties of said filter media, said filter media retainer frame comprises a rectangular section and four diagonally disposed substantially V-shaped members, said rectangular section retaining one of said filter pockets and said V-shaped members retaining said other filter pocket.

2. A filter according to claim 1 wherein said holding means are two wire-like members, each pivotally attached to said housing and each adapted to attach a portion of said filter media in an airtight manner on said portion.

* * * * *